(12) United States Patent
Banko et al.

(10) Patent No.: US 12,216,998 B2
(45) Date of Patent: *Feb. 4, 2025

(54) DETECTING ONLINE CONTEXTUAL EVOLUTION OF LINGUISTIC TERMS

(71) Applicant: Discord Inc., San Francisco, CA (US)

(72) Inventors: Michele Banko, San Francisco, CA (US); Taylor Rhyne, San Francisco, CA (US)

(73) Assignee: Discord Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/377,690

(22) Filed: Oct. 6, 2023

(65) Prior Publication Data

US 2024/0037333 A1  Feb. 1, 2024

Related U.S. Application Data

(63) Continuation of application No. 18/062,046, filed on Dec. 6, 2022, now Pat. No. 11,816,433, which is a (Continued)

(51) Int. Cl.
 *G06F 40/279* (2020.01)
 *G06F 40/30* (2020.01)
 (Continued)

(52) U.S. Cl.
 CPC .......... *G06F 40/279* (2020.01); *G06F 40/30* (2020.01); *H04L 51/52* (2022.05); *G06N 20/00* (2019.01)

(58) Field of Classification Search
 None
 See application file for complete search history.

(56) References Cited

U.S. PATENT DOCUMENTS

| | | | |
|---|---|---|---|
| 9,451,085 B2* | 9/2016 | Skiba | A47L 13/20 |
| 9,961,115 B2* | 5/2018 | Dalton | H04L 51/212 |

(Continued)

FOREIGN PATENT DOCUMENTS

| | | |
|---|---|---|
| JP | 2003-216563 A | 7/2003 |
| WO | 2007/043322 A1 | 4/2007 |
| WO | 2009/096523 A1 | 8/2009 |

OTHER PUBLICATIONS

Tsakalidis et al.; "Sequential Modelling of the Evolution of Word Representations for Semantic Change Detection"; Proceedings of the 2020 Conference of Empirical Methods in Natural Language Processing, pp. 8485-8497, Nov. 16-20, 2020. Retrieved on Jan. 16, 2022. Retrieved from <URL:https://aclanthology.org/2020.emnlp-main.682.pdf>entire.

(Continued)

*Primary Examiner* — Nafiz E Hoque
(74) *Attorney, Agent, or Firm* — Polsinelli PC

(57) ABSTRACT

The present invention extends to methods, systems, and computer program products for detecting online contextual evolution of linguistic terms. Within messaging sources, some users may actively attempt to (relatively quickly) shift the meaning of a word or term. Some users may attempt to perjorate a word or term to have a more toxic meaning. Other users may attempt to reappropriate a word or term to have a less toxic or even a positive meaning. Aspects of the invention identify shifts in implied meanings of words and/or phrases over time. As such, emerging forms of harassment can be identified more quickly. Aspects of the invention can utilize users' behavioral histories as well as messaging structures to improve confidence when identifying term evolution. Machine learning algorithms can be configured to identify term evolution reducing workload on human moderators.

17 Claims, 6 Drawing Sheets

Related U.S. Application Data continuation of application No. 17/094,635, filed on Nov. 10, 2020, now Pat. No. 11,551,001.

(51) Int. Cl.
*H04L 51/52* (2022.01)
*G06N 20/00* (2019.01)

(56) References Cited

U.S. PATENT DOCUMENTS

| | | | |
|---|---|---|---|
| 10,303,762 B2 * | 5/2019 | Markman | G06F 40/30 |
| 10,810,373 B1 * | 10/2020 | Pappu | G06N 20/00 |
| 2002/0059069 A1 | 5/2002 | Hsu et al. | |
| 2010/0262454 A1 | 10/2010 | Sommer et al. | |
| 2014/0172989 A1 * | 6/2014 | Rubinstein | H04L 51/212 709/206 |
| 2014/0195518 A1 | 7/2014 | Kelsey et al. | |
| 2017/0083817 A1 | 3/2017 | Di Sciullo et al. | |
| 2018/0032886 A1 | 2/2018 | Danson et al. | |
| 2018/0341877 A1 * | 11/2018 | Panattoni | G06N 5/025 |
| 2020/0134058 A1 | 4/2020 | Liu et al. | |
| 2020/0311202 A1 | 10/2020 | Zhang et al. | |
| 2021/0043192 A1 | 2/2021 | Banko et al. | |
| 2023/0401382 A1 * | 12/2023 | Hombaiah | G06F 40/30 |

OTHER PUBLICATIONS

Wang et al.; "Practical Transformer-based Multilingual Text Classification", Proceedings of NAACL HLT 2021: Industry Track Papers, pp. 121-129, Jun. 6-11, 2021. Retrieved on Jan. 16, 2022. Retrieved from <URL:https://aclanthology.org/2021.naacl-industry.16pdf>entire document.

European Search Report; dated Sep. 19, 2024; application # 21892735.8.

Risch Julian et al: "Toxic Comment Detection in Online Discussions" In: "Deep Learning-Based Approaches for Sentiment Analysis", Jan. 25, 2020, Springer Singapore, XP093194359, ISSN: 2524-7565, pp. 85-109, DOI: 10.1007/978-981-15-1216-24.

Brassard-Gourdeau Eloi et al: "Subversive Toxicity Detection using Sentiment Information", Proceedings of the Third Workshop on Abusive Language Online, Aug. 1, 2019, pp. 1-10, XP093194364, DOI: 10.18653/v1/W19-3501.

Japanese Notice of Reason for Refusal; dated Sep. 26, 2024; Application # 2023-552160.

* cited by examiner

DETECTING ONLINE CONTEXTUAL EVOLUTION OF LINGUISTIC TERMS

CROSS-REFERENCE TO RELATED APPLICATIONS

This application is a continuation of and claims the benefit of U.S. application Ser. No. 18/062,046, filed on Dec. 6, 2022, entitled "DETECTING ONLINE CONTEXTUAL EVOLUTION OF LINGUISTIC TERMS", which is a continuation of and claims the benefit of U.S. patent application Ser. No. 17/094,635, filed on Nov. 10, 2020, entitled "DETECTING ONLINE CONTEXTUAL EVOLUTION OF LINGUISTIC TERMS," All of which are expressly incorporated by reference herein in their entireties.

BACKGROUND

1. Field of the Invention

This invention relates generally to detecting online contextual evolution of linguistic terms, and, more particularly, to detecting online linguistic pejoration and detecting online linguistic reappropriation.

2. Related Art

In linguistics, pejoration is the downgrading or depreciation of a linguistic term's (e.g., a word's) meaning from a more positive sense to a less positive sense. For example, a word can be downgraded from a positive sense to a neutral sense or a negative sense (or from a neutral sense to a negative sense). On the other hand, reappropriation is an upgrading of a linguistic term's (e.g., a word's) meaning from a more negative sense to a less negative sense. For example, a word can be upgraded from a negative sense to a neutral sense or positive sense (or from a neutral sense to a positive sense).

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for detecting online contextual evolution of linguistic terms.

Within messaging sources (e.g., social media and other networks), some users may actively attempt to (relatively quickly) shift the meaning of a word or term. Some users may attempt to pejorate a word or term to have a more toxic meaning. For example, adversarial agents on the Web often attempt to force historically "safe" words into new, more insidious meanings. The users may then use the word or term to harass other users based on the pejorated meaning. Since the word or phrase is historically not toxic or "safe", the harassment is less likely to be detected. Other users may attempt to reappropriate a word or term to have a less toxic or even a positive meaning. For example, a group of users or a community may attempt to force a word or term with an historically negative meaning into a new more positive meaning.

Aspects of the invention identify shifts in implied meanings of words and/or phrases (e.g., pejoration or reappropriation) over time. Aspects of the invention can utilize users' behavioral histories as well as messaging structures to improve confidence when identifying shifts in implied meanings. Machine learning algorithms can be configured to identify shifts in implied meanings reducing workload on human moderators. As such, with respect to pejoration, emerging forms of harassment can be identified more quickly.

Figure 1:
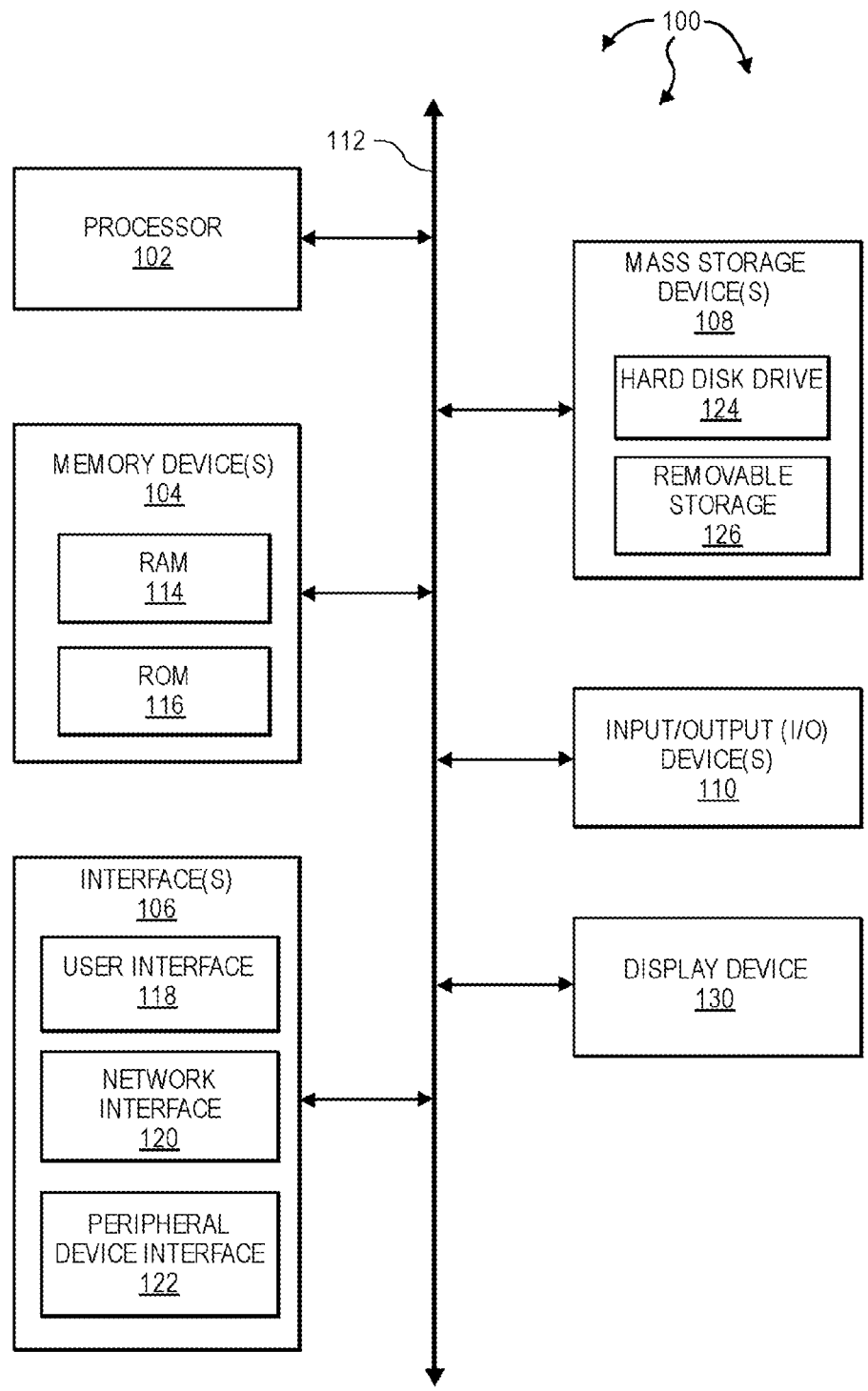
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2A:
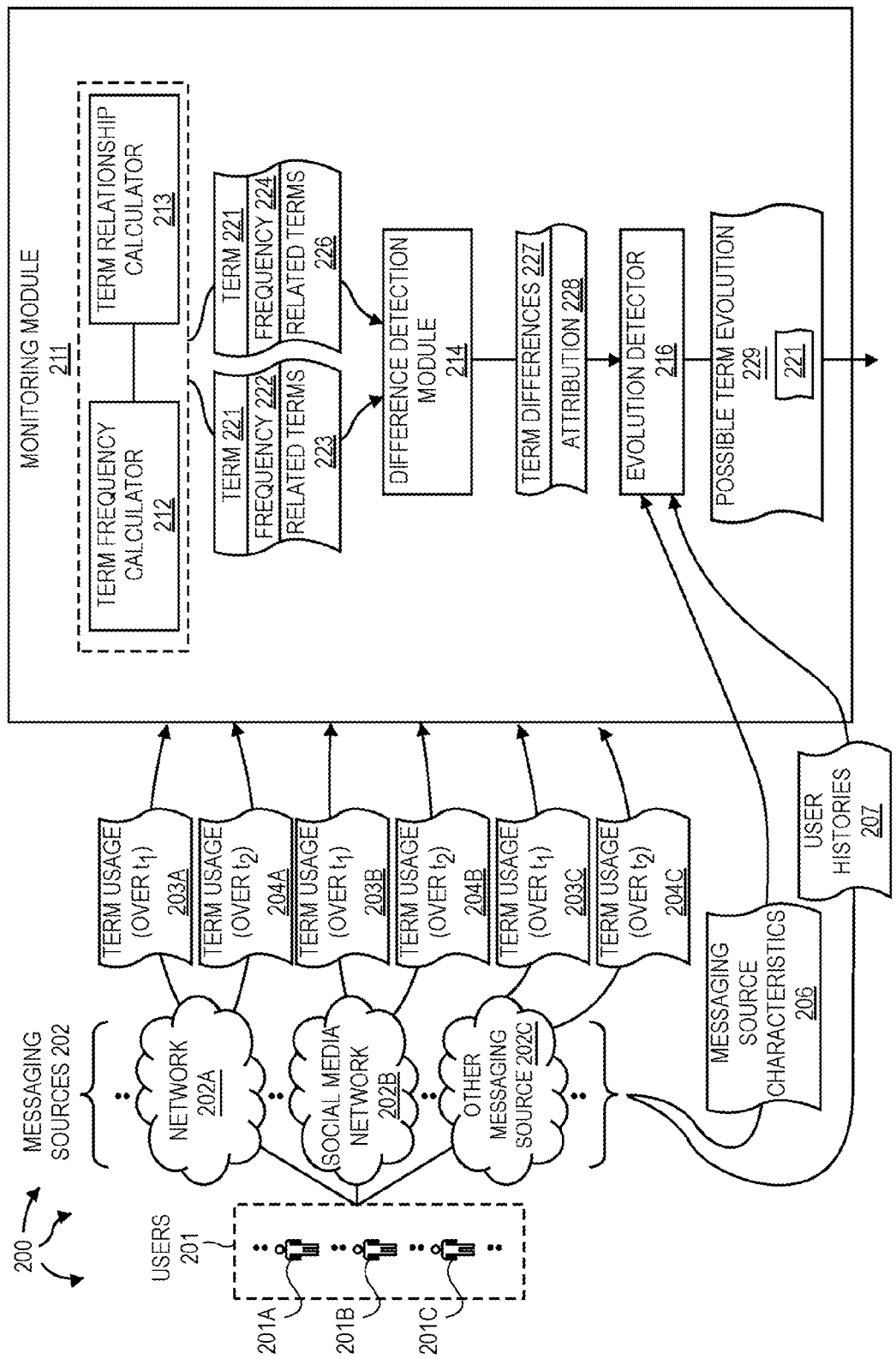
FIGS. 2A and 2B illustrates an example computer architecture that facilitates detecting online contextual evolution of linguistic terms.
Figure 2B:
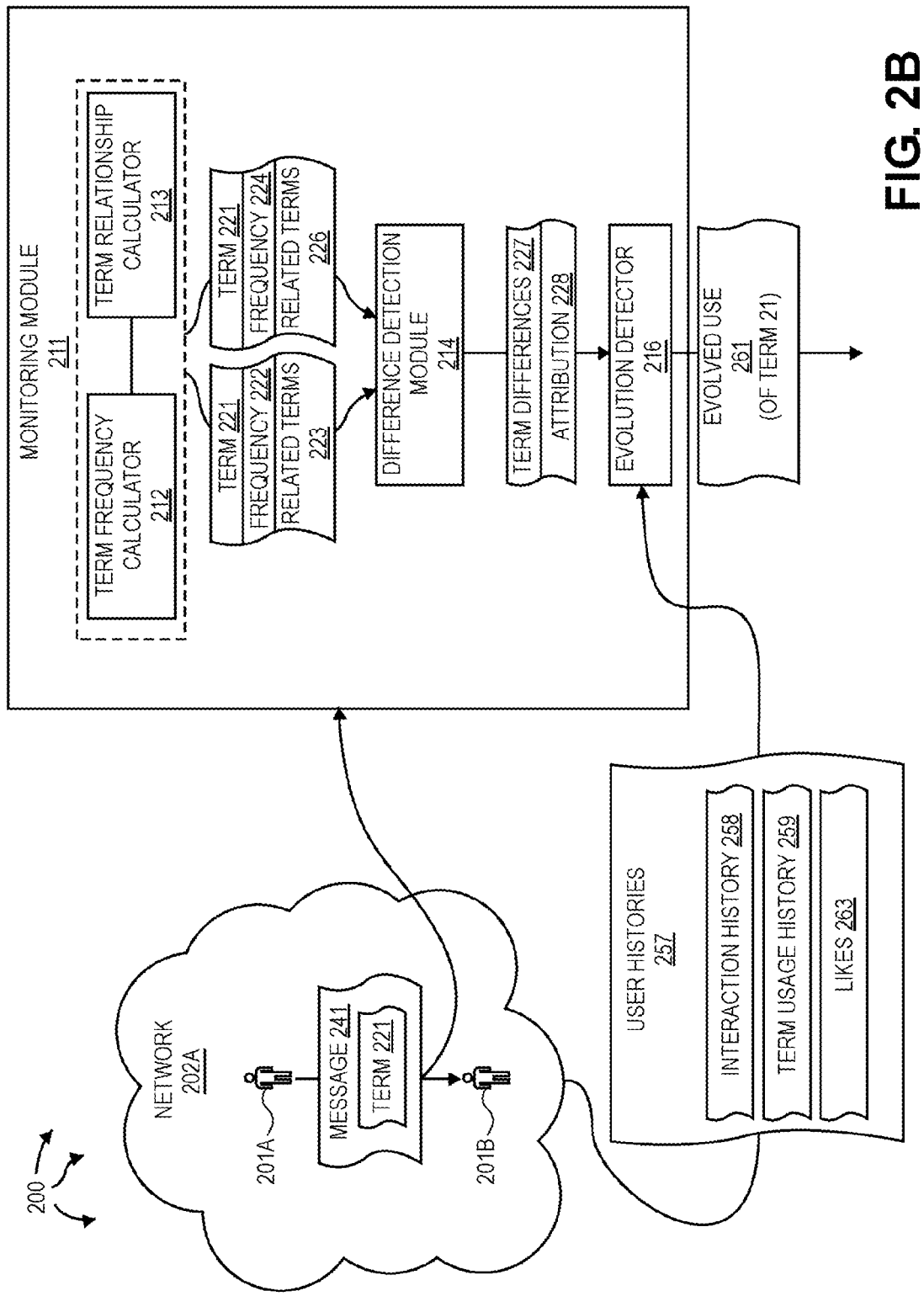

FIGS. 2A and 2B illustrate an example computer architecture 200 that facilitates detecting contextual evolution of linguistic terms. As depicted, users 201 may have accounts with and/or use messaging sources 202. Users 201 can post messages, view messages, and exchange messages with one another via messaging sources 202. Each of users 201 can have accounts with one or more messaging sources. For example, user 201A may be have account with network 202A and social media network 202B, user 201B may have an account with network 202A, social media network 202B, and other message source 202C (e.g., an interoffice chat, a video game infrastructure, a subreddit, an online dating site, etc.), user 201C may have an account with network 202A and other messaging source 202C, etc. Social media network 202B may be a social media network that historically has permitted (or at least not prohibited) the use of toxic language, such as, for example, racial slurs, homophobic language, aggressive language, etc.

Monitoring module 211 can monitor activity across messaging sources 202, including the usage of linguistic terms. As depicted, monitoring module 211 includes term frequency calculator 212, term relationship calculator 213, difference detection module 214, and evolution detector 216. Term frequency calculator 212 can determine the frequency with which terms are included in messages at different messaging sources. Term relationship calculator 213 can determine the relationship between different terms included in messages at different messaging sources. In one aspect, term relationship calculator 213 calculates a numerical value indicating how related one term is to another term. The numerical values can range from 0.0 to 1.0 with higher numbers indicating increased relatedness.

For terms included in messages, difference detection module 214 can determine differences in frequency and differences in related terms over different periods of time across different messaging sources 202. Difference detection module 214 can attribute differences in frequency and/or related terms to specific messaging sources and/or specific users. In general, evolution detector 216 can consider attributed term differences along with messaging source characteristics and user histories to detect attempts to shift the meaning of (e.g., pejorate or reappropriate) a linguistic term. Evolution detector 216 can also consider attributed term differences along with more detailed user histories, including user interaction history, term usage history, and user reactions to detect specific attempts to shift the meaning use a linguistic term (either positively or negatively). User reactions may include, for example, positive reactions (e.g., likes or upvotes), negative reactions (e.g., frowning emojis or down votes), or express harassment reports sent by an offended user.

Figure 3:
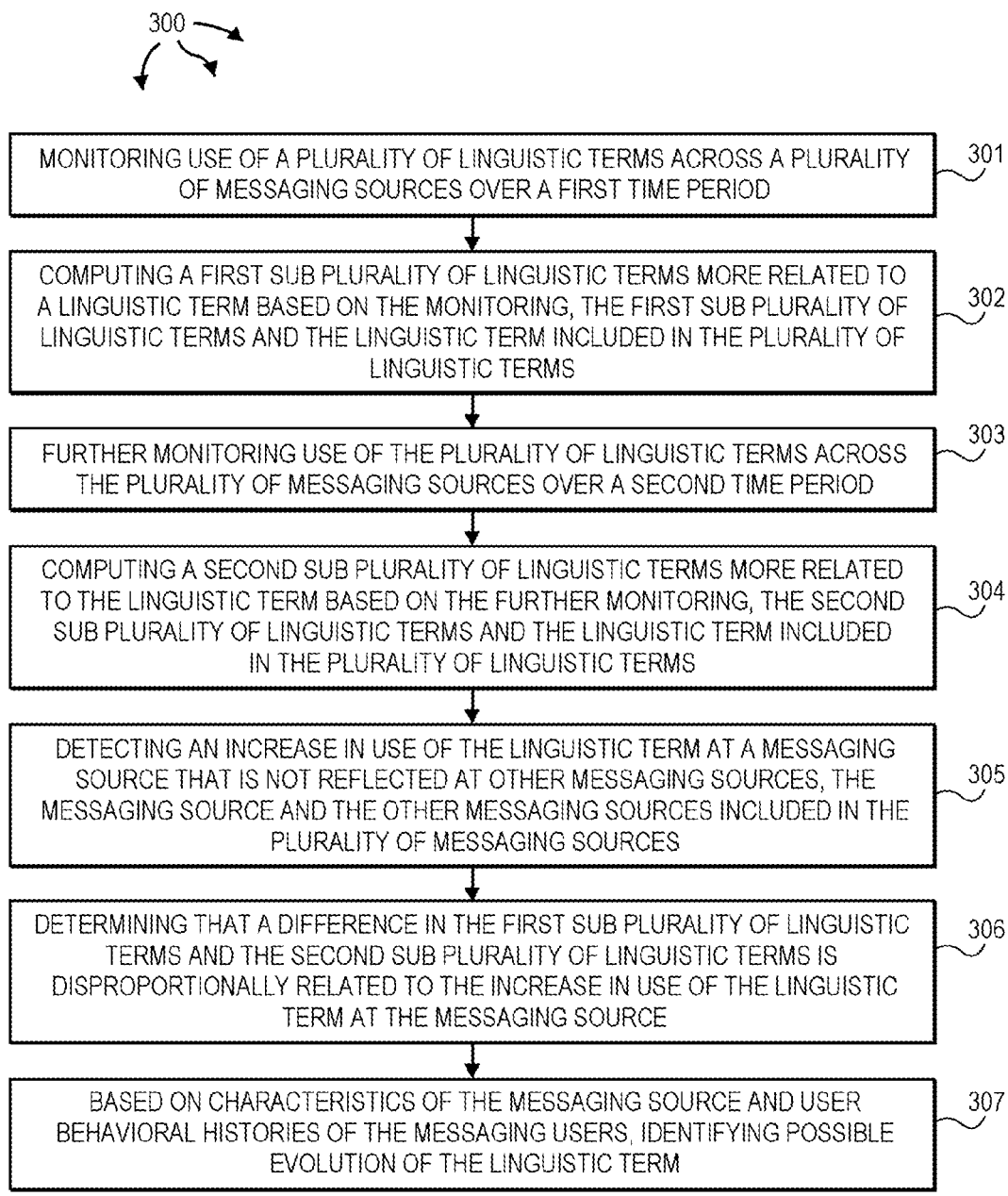
FIG. 3 illustrates a flow chart of an example method for detecting online contextual evolution of linguistic terms.

FIG. 3 illustrates a flow chart of an example method 300 for detecting online contextual evolution of linguistic terms. Method 300 will be described with respect to the components and data in FIG. 2A.

Method 300 includes monitoring use of a plurality of linguistic terms across a plurality of messaging sources over a first time period (301). For example, monitoring module 211 can monitor term usage 203A, term usage 203B, and term usage 203C from network 202A, social media network 202B, and other messaging source 202C respectively over time period $t_1$. Term usage 203A, term usage 203B, and term usage 203C can indicate the usage of a plurality of linguistic terms, including term 221, at network 202A, social media network 202B, and other messaging source 202C respectively over time period $t_1$.

Method 300 incudes computing a first sub plurality of linguistic terms more related to a linguistic term based on the monitoring, the first sub plurality of linguistic terms and the linguistic term included in the plurality of linguistic terms (302). For example, term relationship calculator 213 can calculate related terms 223 from term usage 203A, term usage 203B, and term usage 203C. Related terms 223 can be terms used more frequently in combination with term 221 and/or terms used in similar context to term 221. Term frequency calculator 212 can calculate frequency 222 of term 221. Frequency 222 can indicate the frequency with which term 221 is used across social media networks 202 during time period $t_1$.

Method 300 includes further monitoring use of the plurality of linguistic terms across the plurality of messaging sources over a second time period (303). For example, monitoring module 211 can monitor term usage 204A, term usage 204B, and term usage 204C at network 202A, social media network 202B, and other messaging source 202C respectively over time period $t_2$. Term usage 204A, term usage 204B, and term usage 204C can indicate the usage of a plurality of linguistic terms, including term 221, at network 202A, social media network 202B, and other messaging source 202C respectively over time period $t_2$.

Method 300 includes computing a second sub plurality of linguistic terms more related to the linguistic term based on the further monitoring, the second sub plurality of linguistic terms and the linguistic term included in the plurality of linguistic terms (304). For example, term relationship calculator 213 can calculate related terms 226 from term usage 204A, term usage 204B, and term usage 204C. Related terms 226 can be terms used more frequently in combination with term 221 and/or terms used in similar context to term 221. Term frequency calculator 212 can calculate frequency 224 of term 221. Frequency 224 can indicate the frequency with which term 221 is used across messaging sources 202 during time period $t_2$.

Method 300 includes detecting an increase in use of the linguistic term at a messaging source that is not reflected at other messaging sources, the messaging source and the other messaging source included in the plurality of messaging sources (305). For example, difference detection module 214 can compare frequency 222 and frequency 224. Difference detection module 214 can determine frequency 224 is greater than frequency 222 and thus term 221 was used more during time period $t_2$ than during time period $t_1$. From the frequency comparison, difference detection module 214 can also attribute the increase in usage of term 221 to usage at social media network 202B during time period $t_2$ relative to time period $t_1$. However, increased usage may not be reflected at network 202A and other messaging source 202C.

Difference detection module 214 can also detect differences in related terms 223 and related terms 226 (i.e., terms more related to term 221). Difference detection module 214 can compare related terms 223 to related terms 226. Difference detection module 214 can identify differences in related terms 223 and 226 (and thus determine how terms related to term 221 changed from time period $t_1$ to time period $t_2$.) From the related terms comparison, difference detection module 214 can also attribute differences in related terms to usage at social media network 202B during time period $t_2$ relative to time period $t_1$. However, differences in related terms may not be reflected at network 202A and other messaging source 202C, Difference detection module 214 can combine differences in term frequency and differences in related terms into term differences 227. Difference detection module 214 can attribute changes in term frequency and/or related terms to particular messaging sources (e.g., social media network 202B) in attribution 228.

Method 300 includes determining that a difference in the first sub plurality of linguistic terms and the second sub plurality of linguistic terms is disproportionally related to the increase in use of the linguistic term at the messaging source (306). For example, from attribution 228, evolution detector 216 can determine that term differences 227 are disproportionately related to an increase in use of the term 221 at social media network 202B.

Method 300 incudes, based on characteristics of the messaging source and user behavioral histories of the messaging users, identifying possible evolution (e.g., pejoration or reappropriation) of the linguistic term (307). For example, evolution detector 216 can access messaging source characteristics 206 and user histories 207 from messaging sources 202. Evolution detector 216 can determine the characteristics of social media network 202B from messaging source characteristics 206. Evolution detector 216 can also access histories for users of social media network 202B from user histories 207. Based on characteristics of social media network 202B and user histories of social media network 202B's users, evolution detector 216 can detect possible evolution 229 of term 221.

For example, social media network 202B and/or users of social media network 202B may have a history of and/or be more likely to attempt pejorating the meaning of historically neutral or positive words into new, more insidious or toxic meanings. In response, evolution detector 216 can place term 221 on a watch list to monitor for pejoration. Alternately, social media network 202B and/or users of social media network 202B may have a history of and/or be more likely to attempt reappropriating the meaning of historically neutral or negative words into new, more positive meanings.

Figure 4:
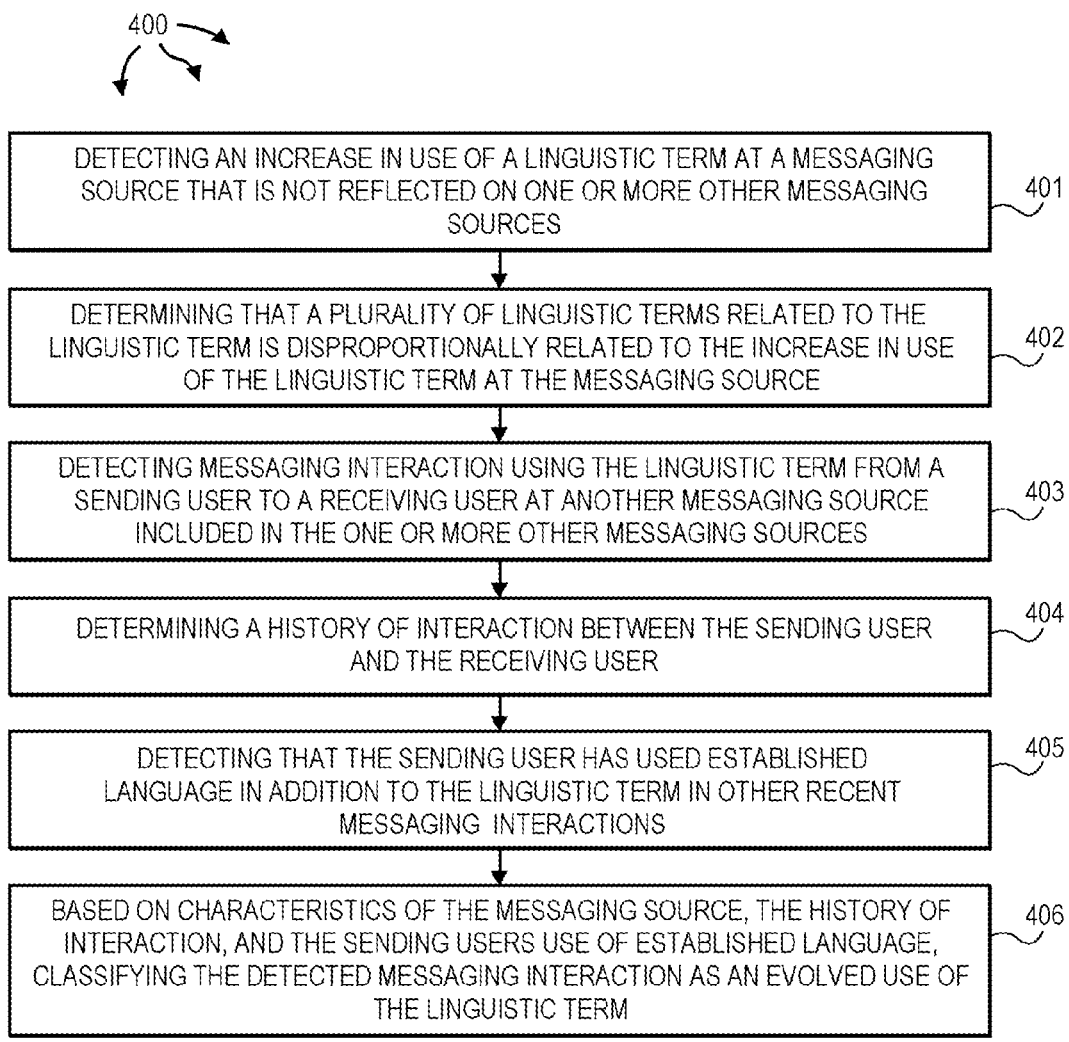
FIG. 4 illustrates a flow chart of an example method for detecting online contextual evolution of linguistic terms.

FIG. 4 illustrates a flow chart of an example method 400 for detecting online contextual evolution of linguistic terms. Method 400 will be described with respect to the components and data in FIG. 2B.

Method 400 includes detecting an increase in use of a linguistic term at a messaging source that is not reflected on one or more other messaging sources (401). For example, difference detection module 214 can detect that frequency 224 (usage of term 221 during time period $t_2$) is greater than frequency 222 (usage of term 221 during time period $t_1$). Difference detection module 214 can attribute the increase to an increase in use of term 221 at social media network 202B that is not reflected at network 202A or other messaging source 202C.

Method 400 includes determining that a plurality of linguistic terms related to the linguistic term is disproportionally related to the increase in use of the linguistic term at the messaging source (402). For example, difference detection module 214 can determine that term differences 227 (i.e., differences between related terms 223 and related terms 226) is disproportionately related to increase use of term 221 at social media network 202B.

Method 400 includes detecting messaging interaction using the linguistic term from a sending user to a receiving user at another messaging source included in the one or more other messaging sources (403). For example, monitoring module 211 can detect user 201A send message 241, including term 221, to user 201B on network 202A.

Evolution detector 216 can access user histories 257 for network 202A. As depicted, user histories 257 include user interaction history 258, term usage history 259, and likes (e.g., upvotes) 263. User interaction history 258 can indicate the history of interactions between different users of network 202A. Term usage history 259 can indicate what, if any, users have a history of using known toxic words or terminology (e.g., racial slurs, aggressive language, etc.). Likes 263 can indicate if other users with a history of using known toxic words or terminology are liking (or upvoting) messages.

Alternately, term usage history 259 can indicate what, if any, users have a history of using known positive words or terminology (e.g., in attempts to reappropriate racial slurs, aggressive language, etc.). Likes 263 can indicate if other users with a history of using known positive words or terminology are liking (or upvoting) messages.

Method 400 includes determining a history of interaction between the sending user and the receiving user (404). For example, from interaction history 258, evolution detector 216 can determine that user 201A and user 201B have no recent (e.g., within a specified time frame) history of interaction. Alternately, from interaction history 258, evolution detector 216 can determine that user 201A and user 201B have a (e.g., within the specified time frame) history of interaction satisfying a threshold.

Method 400 includes detecting that the sending user has used established (e.g., pejorative or reappropriative) language in addition to the linguistic term in other recent messaging interactions (405). For example, based on term usage history 259, evolution detector 216 can detect that user 201A has used established toxic language (e.g., racial slurs, aggressive language, etc.), in addition to term 221, in other recent (e.g., within a second specified time frame) messaging interactions on network 202A. Alternately, based on term usage history 259, evolution detector 216 can detect that user 201A has used established reappropriative language (e.g., in attempts to reappropriate slurs, aggressive language, etc.), in addition to term 221, in other recent (e.g., within a second specified time frame) messaging interactions on network 202A.

Method 400 includes, based on characteristics of the messaging source, the history of interaction, and the sending users use of established language, classifying the detected social media interaction as an evolved use of the linguistic term (406). For example, evolution detector 216 can classify message 241 as evolved (and pejorative) use 261 of term 221 based on characteristics of network 202A, no recent history of interaction between user 201A and user 201B, and user 201A's use of established toxic language. Evolution detector 216 can surface evolved (and pejorative) use 261, for example, to a human moderator for confirmation. Alternately, evolution detector 216 can classify message 241 as evolved (and reappropriative) use 261 of term 221 based on characteristics of network 202A, the threshold recent history of interaction between user 201A and user 201B, and user 201A's use of established reappropriative language. Evolution detector 216 can surface evolved (and reappropriative) use 261, for example, to a human moderator for confirmation.

Figure 5:
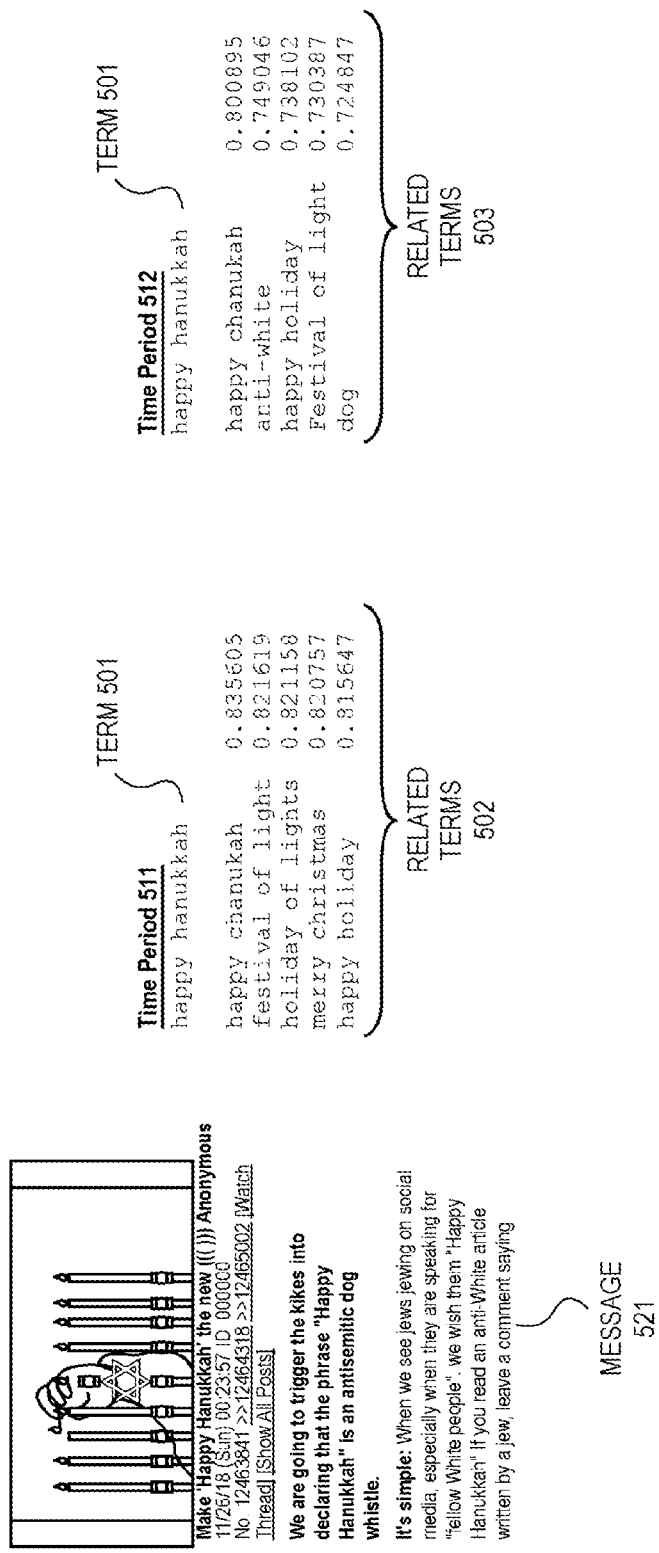
FIG. 5 illustrates an example of attempted linguistic pejoration.

FIG. 5 illustrates an example of attempted linguistic pejoration. For time period 511, term 501 can be related to related terms 502 (e.g., as determined by term relationship calculator 213). The higher the number associated with a related term, the more related the term (e.g., where 1.0 indicates total similarity). For example, for time period 511, "festival of light" is more related to "happy hanukkah" than "merry Christmas".

For subsequent time period 512, term 501 can be related to related terms 503 (e.g., as determined by term relationship calculator 213). As depicted, "anti-white" and "dog" are related to "happy hanukkah" for time period 512. During time period 512, "Happy Hanukkah" (HH) may begin to show up with greater frequency on one social network (e.g., in messages similar to message 521), but the magnitude of the frequency spike is not mirrored on other social media sites. The one social network may be a known "bad" site. Due to the frequency spike at a known bad site, "Happy Hanukkah" can be placed on a watchlist of sensitive phrases to monitor for pejoration.

Even later, "Happy Hanukkah" can appear in a social media post sent from a sending user to a receiving user that have no recent history of direct interaction. It may also be detected (e.g., by monitoring module 211) that the sender has interacted with many other accounts he/she has not recently interacted with. Some of the sender's messages may also include other well-established racial slurs and aggressive language in addition to "Happy Hanukkah". The sender's messages may also be receiving likes or upvotes from other users with a history of using toxic language. As such, it can be determined (e.g., by pejoration detector 216) that the sender's use of "Happy Hanukkah" is hate speech. Accordingly, the sender's user of "Happy Hanukkah" can be surfaced to a human moderator for confirmation.

Mechanisms similar to those described with respect to FIG. 5 can be used to depict attempted linguistic reappropriation.

Aspects of the invention include using and can be implemented using machine learning, neural networks, and other automated mechanisms to reduce the workload of human moderators. For example, machine learning and neural network modules can be used to implement the functionality of modules included in monitoring module 211. Machine learning and neural network modules can also identify possible evolution (e.g., pejoration or reappropriation) of linguistics terms more effectively and efficiently relative to human moderators.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, term usage, messaging characteristics, user histories, interaction history, term usage history, likes, frequencies, related terms, term differences, attribution, possible pejoration, pejorative use, possible reappropriation, reappropriative use, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, term usage, social media network characteristics, user histories, interaction history, term usage history, likes, frequencies, related terms, term differences, attribution, possible pejoration, pejorative use, possible reappropriation, reappropriative use, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the embodiments discussed above may comprise computer hardware, software, firmware, or any combination thereof to perform at least a portion of their functions. For example, a computer system may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A computer-implemented method comprising:
   detecting an increase in use of a linguistic term at a messaging source;
   determining that a plurality of linguistic terms related to the linguistic term are disproportionally related to the increase in use of the linguistic term at the messaging source;
   determining a history of interaction using the linguistic term from a sending user to a receiving user at another messaging source;
   identifying a possible evolution of the linguistic term based on user reactions to the linguistic term at the messaging source, wherein the identifying the possible evolution considers the history of interaction;
   classifying one or more messages as including an evolved use of the linguistic term; and
   sending a message for confirmation of the evolved use by a moderator.

2. The computer-implemented method of claim 1, wherein the messaging source has a history of using toxic language.

3. The computer-implemented method of claim 1, wherein the messaging source has a history of using reappropriative language.

4. The computer-implemented method of claim 1, wherein the identifying the possible evolution considers characteristics of the messaging source and user behavior histories of users interacting with messages containing the linguistic term, and wherein the characteristics and user behavioral histories are based on detecting that the sending user has used established language in addition to the linguistic term in other recent messaging interactions.

5. The computer-implemented method of claim 1, further comprising placing the linguistic term on a watch list to monitor for pejorative use of the linguistic term.

6. The computer-implemented method of claim 1, further comprising:
   computing a first sub-plurality of linguistic terms more related to the linguistic term based on a numerical value indicative of relatedness, the first sub-plurality of linguistic terms and the linguistic term included in the plurality of linguistic terms.

7. A system comprising:
   one or more processors; and
   a non-transitory computer-readable medium storing instructions that, when executed by the one or more processors, cause the one or more processors to:

detect an increase in use of a linguistic term at a messaging source;

determine that a plurality of linguistic terms related to the linguistic term are disproportionally related to the increase in use of the linguistic term at the messaging source;

determining a history of interaction using the linguistic term from a sending user to a receiving user at another messaging source;

identify a possible evolution of the linguistic term based on user reactions to the linguistic term at the messaging source, wherein the identifying the possible evolution considers the history of interaction;

classify one or more messages as including an evolved use of the linguistic term; and send a message for confirmation of the evolved use by a moderator.

8. The system of claim 7, wherein the messaging source is known to use toxic language.

9. The system of claim 7, wherein the messaging source has a history of using reappropriative language.

10. The system of claim 7, wherein the identifying the possible evolution considers characteristics of the messaging source and user behavior histories of users interacting with messages containing the linguistic term, and, wherein the characteristics and user behavioral histories are based on detecting that the sending user has used established language in addition to the linguistic term in other recent messaging interactions.

11. The system of claim 7, wherein the non-transitory computer-readable medium further causes the one or more processors to:

place the linguistic term on a watch list to monitor for pejorative use of the linguistic term.

12. The system of claim 7, wherein the non-transitory computer-readable medium further causes the one or more processors to:

compute a first sub-plurality of linguistic terms more related to the linguistic term based on a numerical value indicative of relatedness, the first sub-plurality of linguistic terms and the linguistic term included in the plurality of linguistic terms.

13. The system of claim 7, wherein the non-transitory computer-readable medium further causes the one or more processors to:

receive positive or negative reaction to the linguistic term to shift a meaning associated with the evolved use.

14. A non-transitory computer-readable storage medium comprising instructions stored thereon, the instructions effective to cause a system to:

detect an increase in use of a linguistic term at a messaging source;

determine that a plurality of linguistic terms related to the linguistic term are disproportionally related to the increase in use of the linguistic term at the messaging source;

determine a history of interaction using the linguistic term from a sending user to a receiving user at another messaging source;

identify a possible evolution of the linguistic term based on user reactions to the linguistic term at the messaging source, wherein the identifying the possible evolution considers the history of interaction;

classify one or more messages as including an evolved use of the linguistic term; and send a message for confirmation of the evolved use by a moderator.

15. The non-transitory computer-readable storage medium of claim 14, wherein the messaging source is known to use toxic language.

16. The non-transitory computer-readable storage medium of claim 14, wherein the messaging source has a history of using reappropriative language.

17. The system of claim 14, wherein the identifying the possible evolution considers characteristics of the messaging source and user behavior histories of users interacting with messages containing the linguistic term, and, wherein the characteristics and user behavioral histories are based on detecting that the sending user has used established language in addition to the linguistic term in other recent messaging interactions.

* * * * *